United States Patent [19]

Wasson et al.

[11] Patent Number: 5,495,376
[45] Date of Patent: Feb. 27, 1996

[54] POWER LOSS ACTUATED MAGNETIC LATCH SYSTEM FOR HEAD-ARM ASSEMBLY

[75] Inventors: Ken G. Wasson, Foster City; Masahiro Mita; Juro Endo, both of Chula Vista, all of Calif.

[73] Assignee: Hitachi Metals, Ltd., Tokyo, Japan

[21] Appl. No.: 267,307

[22] Filed: Jun. 29, 1994

Related U.S. Application Data

[63] Continuation of Ser. No. 844,110, Mar. 2, 1992, abandoned.
[51] Int. Cl.$^6$ ...................................................... G11B 5/54
[52] U.S. Cl. .......................................... 360/105; 360/104
[58] Field of Search ...................................... 360/105, 106, 360/97.01, 86, 104; 369/244; 335/179, 276, 81, 229

[56] References Cited

U.S. PATENT DOCUMENTS

| | | | |
|---|---|---|---|
| 3,921,107 | 11/1975 | Reuting et al. | 335/179 |
| 4,437,078 | 3/1984 | Bando et al. | 335/234 |
| 4,686,595 | 8/1987 | Bryer | 360/105 |
| 4,751,595 | 6/1988 | Kishi et al. | 360/75 |
| 4,786,995 | 11/1988 | Stupeck et al. | 360/75 |
| 4,831,469 | 5/1989 | Hanson et al. | 360/75 |
| 4,868,695 | 9/1989 | Quatro et al. | 360/105 |
| 4,881,139 | 11/1989 | Hazebrouck | 360/105 |
| 4,903,157 | 2/1990 | Malek | 360/105 |
| 4,980,787 | 12/1990 | Iwanaga | 360/105 |
| 5,189,570 | 2/1993 | Maeda et al. | 360/105 |

Primary Examiner—Stuart S. Levy
Assistant Examiner—Kevin M. Watkins
Attorney, Agent, or Firm—Staas & Halsey

[57] ABSTRACT

A latch mechanism, especially for use in a disk drive, includes a locking arm that rotates about a pivot and engages a slot on the moving member that is to be locked, such as a head-arm. In a fixed coil embodiment, a permanent magnet is attached to an inboard end of the locking arm within the windings of a coil. Ferrous elements are mounted between the coil and the pivot of the locking arm. The ferrous elements attract the permanent magnet to hold the locking arm securely in either a latching or an unlatching state. When the coil is energized, poles are induced in the ferrous elements such that one repels the permanent magnet away from its then current state into the opposite state, while the other ferrous element attracts the permanent magnet to the other state. The magnetic field of the coil simultaneously applies a pure torque to the locking arm. This torque rotates the locking arm so that the arm changes to its other state. In a moving coil embodiment, the coil and ferrous elements are attached to the inboard end of the locking arm, and fixed permanent magnets are mounted in a housing or yoke on either side of the coil. No external power is necessary to hold the locking arm in either the latched or unlatched state. The state of the locking arm is determined by the last direction of electric current flow in the coil.

7 Claims, 5 Drawing Sheets

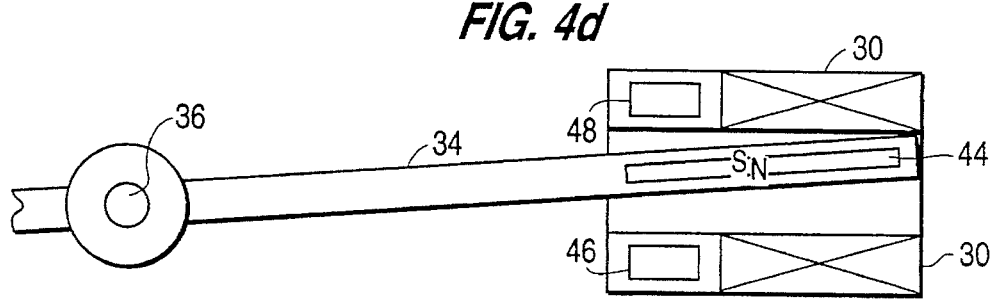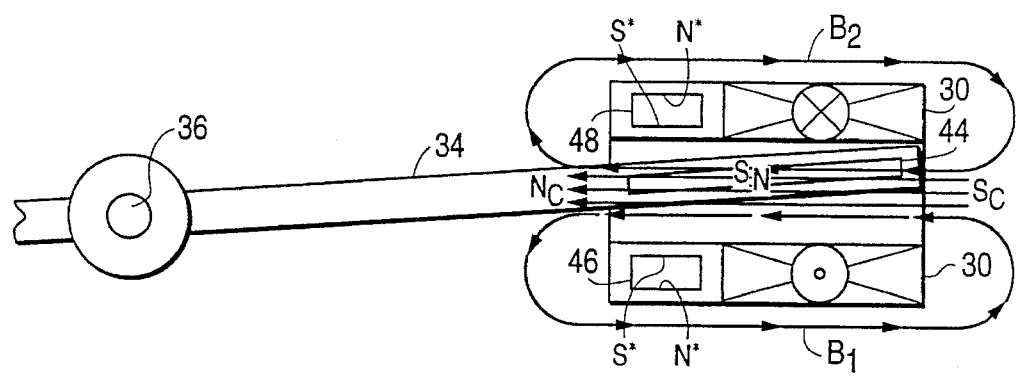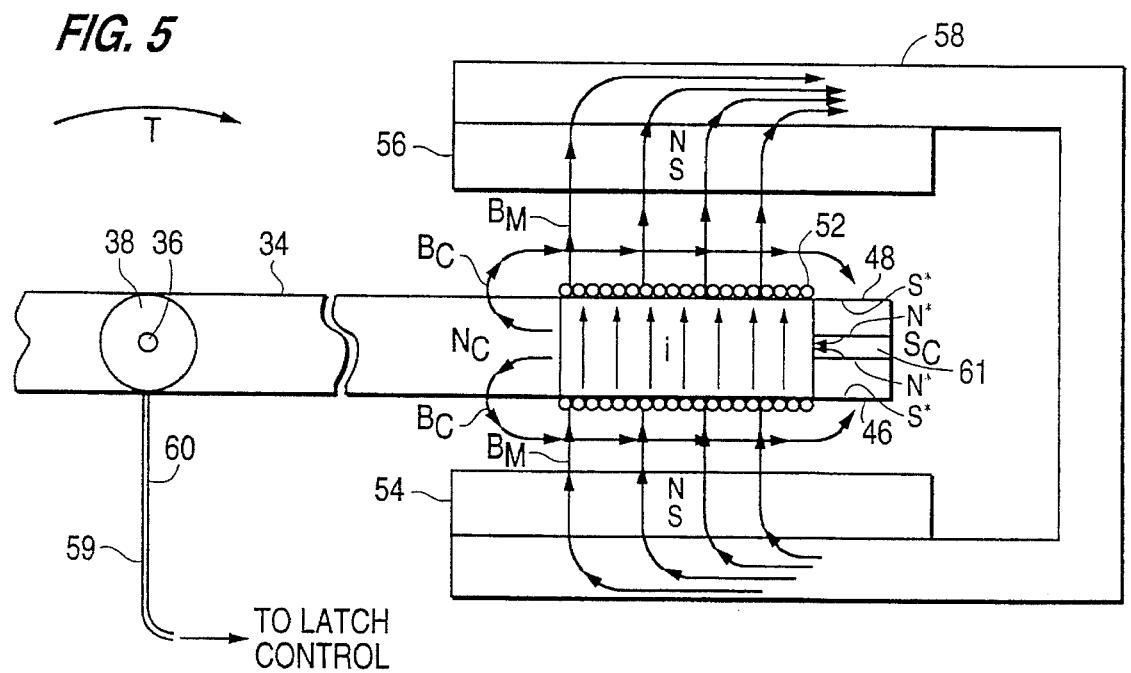

POWER LOSS ACTUATED MAGNETIC LATCH SYSTEM FOR HEAD-ARM ASSEMBLY

This application is a continuation of application Ser. No. 07/844,110, filed Mar. 2, 1992, now abandoned.

BACKGROUND OF THE INVENTION

1. Technical Field

This invention involves a mechanism for latching and unlatching a moving arm, such as the head arm of a disk drive, or other moving member, particularly when power is shut off or fails.

2. Description of Related Art

During the normal operation of a hard disk drive, the read-write heads are aerodynamically lifted above the disk media surface several millionths of an inch by the relative air velocity associated with the spinning disks. When power fails or is intentionally shut off, it is important to move the heads to a safe or "parked" position that is not over the data stored on the disks: if the heads were to come into physical contact with the data media surface, there is a significant probability that the data in the region of contact could be disturbed or lost.

Furthermore, it is important that the heads be kept in a safe parked position while the disk drive is not in use. Portable, laptop and other small computers that contain hard disk drives are particularly susceptible to such head-media contact problems since they are carried about and may be used in mobile environments in which they are jostled, bumped or subjected to other forces. During such motion, the heads could be caused to move radially, which could affect the media material if in contact with the data surface. The head-arm assembly itself, moreover, may also be damaged by too rough handling if it is allowed to move freely. In order to avoid such damage to the data or to the head-arm assembly, the head-arm assembly is locked in a safe position.

Historically, larger computers, which were wired to special power supplies, could be switched to an emergency back-up power source when a power failure occurred. While on back-up power, a special shut-down program saved data being processed, moved the head-arm assembly to a safe parked location, and then shut down the computer system. Most modern computer users, however, do not invest in such "un-interruptable power supplies". In the case of portable computers, users would prefer not to carry such relatively heavy, special power supplies.

In the interests of saving weight and power, particularly for desk-top and portable computers, a scheme has evolved that utilizes the momentum, or, more properly, the kinetic energy stored in the spinning data disks to generate sufficient power to carry out this head-arm parking strategy. According to this known scheme, when a voltage-sensing circuit senses power failure, the circuit switches the drive circuit that controls the disk's spindle motor to immediately cause the spindle motor to act as a generator. The voltage thus generated as the disk spins down is used to drive the head-arm assembly toward the safe position, and can also be used to arm a latch mechanism, which secures the head-arm assembly in the safe position (when it arrives in that position).

The way in which the switching is arranged is typically that a spindle motor driver circuit sends current to the spindle motor via one or more transistor switches, each of which has a first state (motor mode) and a second state (generator mode). The transistors are held in the first state by the voltage from the disk drive power supply; the motor and the attached media disks are thereby caused to accelerate to operating speed and are maintained at that speed by the spindle motor driver circuit, which contains a means of detecting the spindle motor speed.

When the power supply voltage fails or is purposely turned off, the transistor switches assume their "normal" state—the second state—which connects the spindle motor leads to the parking and latch circuits. The switch from the first state to the second state is thus caused by the absence of voltage (similar to a "normally closed" relay contact closure when the relay coil is turned off).

The parking and latch circuit is typically composed of simple transistor switches that are operated by the voltage now present at the spindle motor leads by virtue of the rapid rotation of the spindle motor and the disks, which together have a high moment of inertia and thus, at a high rotational speed, a significant amount of kinetic energy that can be converted at least partially into usable electric current. This parking and latch circuit sends current to the head-arm actuator to turn the actuator toward the direction of the latch.

A commonly used latch consists of a small magnet that attracts a ferro-magnetic piece of metal mounted on the head-arm assembly, usually near the outboard end of the actuator coil mount. This method has the advantage of low cost and simple assembly operations. One of the disadvantages of this method, however, is that it suffers from low latch force—the head-arm assembly may be easily jarred loose from this latch during transport.

Another disadvantage of this conventional method is that the magnetic field from the latch may affect the motion of the head-arm assembly itself (even when the assembly is not to be latched) when the assembly is near the latch. Special circuitry must often be added to the actuator servo system to compensate for this magnetically caused force variation.

A third disadvantage is that the force that the head-arm actuator can provide to unlatch itself during normal start-up and running is inherently limited, and this in turn limits the latching force that the latch may apply to the assembly. The stronger the attraction between the ferro-magnetic piece and the permanent magnet, the greater is the force required for the head-arm assembly to "free" itself during start-up. Some systems have even become "stuck" that is have been unable to unlatch the head-arm; latched computers with low battery voltage (for example after long use without recharging) have proven particularly vulnerable to this problem.

Other known latch mechanisms are purely mechanical. These mechanisms include springs, ramps, spring-loaded clips and other devices that rely on the arm "jamming itself" and are based on the velocity of the head-arm assembly as it is accelerated toward the "safe position". These devices, however, have proven unreliable and difficult to adjust during assembly. If the clip is too tight or narrow, for example, the arm will either not be able to jam itself securely into the safe position, or it will require too much force to free it once it has. Conversely, if the clip is too "loose" or open, it will not hold the assembly securely enough and the assembly may work itself free.

Another conventional latch concept uses an intermediate linkage or lever to locate the magnetic latch away from the vicinity of the actuator coil or media disk. Associated with this linkage is a solenoid mechanism that may include an internal permanent magnet that locks the linkage in place when the power is off. This concept, which is generally more reliable than other conventional methods, is relatively expensive and may have to be adjusted to have the proper holding forces during the production assembly operation. Such linkage systems, especially those that include solenoid actuators, also have relatively many moving parts, each of which increases the complexity, cost and risk of failure of such systems. Furthermore, this type of latch assembly occupies more precious space in the disk drive than the simple magnet latch described above.

The disk drive industry therefore lacks and needs a head-arm latch system that meets the following requirements:

1. The head-arm should stay locked in the safe position when no power is applied to the system, regardless of external forces that tend to jar the head-arm assembly from this position. No power should be consumed to keep the assembly in this locked position.

2. Upon power-up, the head-arm assembly must be easily freed from the latch. The power consumed during this unlatching operation may, however, be relatively high for a short period.

3. During normal disk drive operation, the latch should remain stored in an unarmed state without power consumption. Relatively little force should be required to hold the latch in this state. After the head-arm is released from the latch, the influence of the latch on the performance of the head-arm assembly when the assembly is near the latch should be minimized. There should be no interference with the disk drive operation while in this mode; however, it may be permissible for the latch to become armed and actually capture the head-arm assembly under conditions of extreme shock. While such capture is inconvenient, it should be able to be corrected quickly through a retry of the seek operation.

4. Upon power failure, the latch must arm itself and mechanically immobilize the head-arm assembly when the assembly arrives at the safe position. Power consumption should be relatively low and of short duration (preferably only a few milliseconds) during this operation.

Although not directly related to the efficiency of the latch mechanism itself, it would also be advantageous for the bearings used to mount the moving parts in the latch mechanism to have a long life, while still allowing for rapid acceleration, yet be small enough not to hinder the high degree of miniaturization now sought after in modern disk drives. Furthermore, the amount of particles created as the moving parts of the bearing wear should be kept to a minimum, and preferably no particles should be created at all; this reduces contamination and ensures smooth latch motion.

The object of this invention is to provide a latch mechanism that meets these requirements. Although the invention is especially well-suited for use in latching head-arm assemblies in disk drives, it is also advantageous when used to latch in place other sensitive moving elements that are found in many instruments and other devices.

SUMMARY OF THE INVENTION

A latch mechanism, especially for use in a disk drive, includes a locking arm that rotates about a pivot and has a tang or other locking element that engages a slot or other mating element on the moving member that is to be locked, such as the head-arm of the disk drive. In a fixed-coil embodiment, a permanent magnet is attached to an inboard end of the locking arm within the windings of a coil. Low-reluctance, preferably ferrous elements are mounted near the windings of the coil, preferably between it and the pivot of the locking arm. The ferrous elements attract the permanent magnet to hold it securely in either a latching or an unlatching state.

Upon energization of the coil, poles are induced in the ferrous elements such that one induced pole repels the permanent magnet away from the current state of the attached locking arm into the opposite state, while the other ferrous element attracts the permanent magnet, and thus the attached locking arm, to the opposite state. The magnetic field of the coil simultaneously applies a pure torque to the permanent magnet held securely by the locking arm. This torque acts to rotate the locking arm so that the arm changes to its other state. No external power is necessary to hold the locking arm in either the latched or unlatched state. The state of the locking arm is determined by the last direction of electric current flow in the coil.

The distance between the permanent magnet and the adjacent ferrous element in the latching state is preferably less than the distance between the permanent magnet and the other adjacent ferrous element in the unlatching state. This allows the force required to switch the locking arm into the latching state to be less than the force required to switch the locking arm into the unlatching state.

In a moving coil embodiment, the coil is attached to the inboard end of the locking arm. A permanent magnet is thereby mounted on either side of the locking arm. The two permanent magnets are preferably mounted in a housing, which, if ferrous, also serves as a shield to reduce leakage of the various magnetic fields, especially of the coil when energized.

In the preferred embodiments of the invention, the locking arm is mounted at its center of mass. Since the coil applies a pure torque to the locking arm, this pure torque is translated to the center of mass, so that no significant reaction forces arise on the bearing and the life of the bearing is increased.

According to another aspect of the invention, the locking element on the locking arm preferably is angled or shaped in such a way that the direction of its contact force with the slot or mating element on the moving member is so directed relative to the axis of rotation of the locking arm that the latch locks even more tightly when the head-arm is to be latched and is subjected to a torque in a predetermined direction.

BRIEF DESCRIPTION OF THE DRAWINGS

FIGS. 4a–4d illustrate sequentially the transition of the fixed-coil embodiment of the latch mechanism according to the invention from the latched to the unlatched position, as well as the electrical and magnetic states of the main components, and FIG. 4e illustrates the electrical and magnetic states of the components as the latch is about to switch from the unlatched to the latched position;

FIG. 5 illustrates on a larger scale the elements of a moving coil embodiment of the latch mechanism, as well as the electrical and magnetic states of the main components of the moving coil embodiment of the latch mechanism as it is switching from the unlatched to the latched position;

DESCRIPTION OF THE PREFERRED EMBODIMENTS

The invention is described below with reference to its application in latching a head-arm assembly in a rotary disk drive. The invention is particularly advantageous in this application. Nonetheless, this is by way of example only, since the latch mechanism according to the invention can be used in many other systems in which a moving member must be immobilized quickly and securely.

Figure 1:
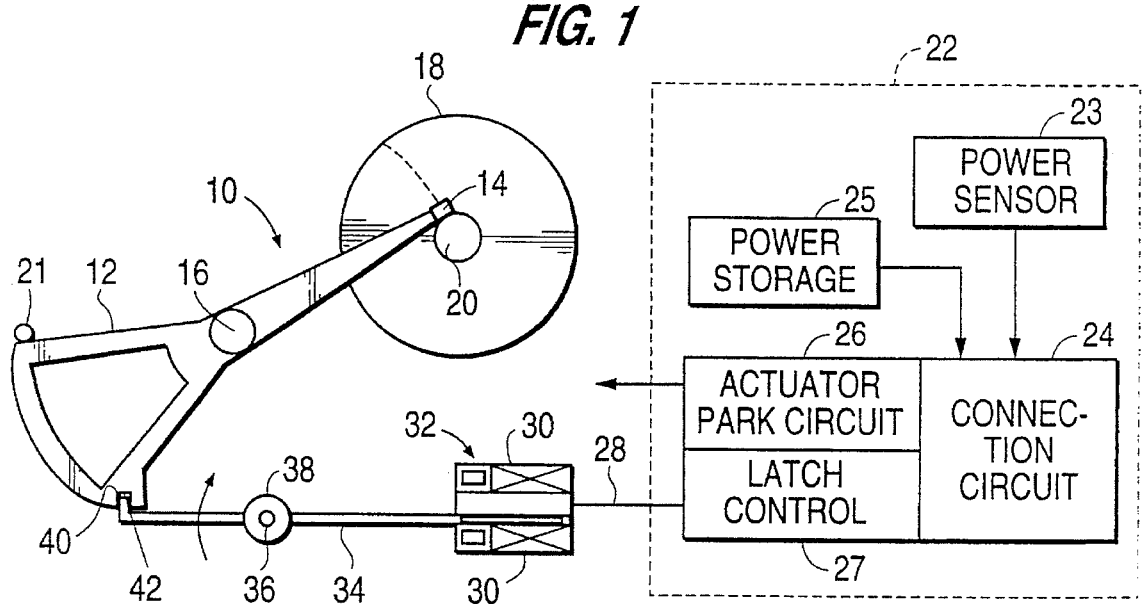
FIG. 1 illustrates the latch mechanism according to the invention in use with a head-arm assembly in a typical rotary hard disk drive, whereby the head-arm assembly is in a safe, latched position.

Referring to FIG. 1, a head-arm assembly in a disk drive is indicated generally by reference number 10. The head-arm includes an actuator end 12 at an outer end and the read/write head itself 14 at the opposite, inner end. The head-arm 10 is mounted on and can rotate about a bearing 16.

FIG. 1 also shows a data disk 18, which rotates on a disk mounting device such as a hub 20. The disk is driven by a conventional spindle motor (not shown). The disk drive also includes power failure circuitry, indicated generally as a controller 22. This circuitry includes a conventional sensor 23 which, when it senses power failure or shut-off to the drive, generates a "power off" signal.

Although not shown, the disk drive also includes a head-arm actuator, which causes the arm to move about the bearing 16. The movement of the head 14 over the surface of the disk 18 is indicated by a dotted line extending from the head 14 adjacent the disk mounting hub 20 to the perimeter.

The controller 22 preferably includes a connection circuit 24, a power storage device 25, an actuator park circuit 26, and a latch control circuit 27. The spindle connection circuit 24 is preferably of the type described above that is connected to the spindle motor leads and switches the disk drive motor from acting as a driving motor to acting as a generator. Switching occurs when the connection circuit 24 senses the "power off" signal from the sensor 23. This arrangement is not, however, necessary according to the invention. Other applications may, for example, have direct control of the latch mechanism according to the invention, with no need for power storage or special switching.

In the case of the disk drive application, the power storage device 25 may be the kinetic energy stored in the spinning spindle motor and attached media disks. In general, however, it may be any type of device that stores electrical current, for example in a capacitive or other circuit, when system power is available, or even a small standard battery or rechargeable battery that receives and stores enough voltage from the system's power supply during operation that it is able to drive the arm homing and latching mechanisms. In such case, the spindle motor lead connecting circuit 24 would not be switching connection of the spindle motor leads, but rather would be switching the electric current stored in the power storage device 25 and passing it to the following head-arm and latch control circuitry. One should keep in mind that the latch mechanism according to this invention may be used to secure sensitive, moving members in other systems than disk drives, which may not have kinetic storage of energy such as a spinning disk.

The actuator park circuit 26 commands the head-arm actuator to rotate the head-arm to the parked or safe position in which the head is not over the surface of the disk, or is at least not able to contact the data storage portion of the disk. In FIG. 1, the head 14 is illustrated in the parked position near the hub 20 of the disk mounting system, which is usually an integral part of the spindle motor rotating outer shell, but this is by way of example only.

In some disk drives, the head-arm is in the parked position when it is also in the so-called "home" position, meaning the position that defines the home data track. In other disk drives, the head-arm is in the parked position when the head 14 is near the perimeter of the disk 18 or on a ramp outside the perimeter of the disk 18. For purposes of this invention, the "parked" "safe" or "home" position can be any predefined angular or linear position of a moving member such as the head-arm 10. Moreover, instruments or systems that need to latch a moving member that does not necessarily have a "parked" position (or systems which have separate circuitry for commanding parking) may use the invention to latch the member but will not require the actuator park circuit 26.

The latch controller 27 receives current via the connection circuit 24 and is electrically connected via conductors 28 to a coil 30 in the latch mechanism according to the invention. The latch mechanism is indicated generally by reference number 32. The latch mechanism 32 also includes a locking arm 34, which, in the preferred embodiments, pivots about a shaft 36 in a bearing 38. The locking arm 34 (and all elements attached to the arm that contribute to its moment of inertia) is preferably mounted so that its axis of rotation passes through its center of mass. In the reference frame of the locking arm, it extends mainly in a longitudinal direction; in the reference frame of the disk drive platform or base, the locking arm extends in a radial direction, preferably out from either side of the pivot or shaft 36.

At least one stopping element 21, often termed a "crash stop", may be a simple peg, motion energy absorbing element, or rebounding element is preferably mounted on a moving or non-moving part of the disk drive beyond the intended limits of motion of the arm. The position of the stopping element(s) 21 may easily be determined by the type of element to be used and the available space in the drive. Typically, there are stopping elements to prevent over-travel in both directions of motion of the head-arm 10; however, for the sake of simplicity, only the stopping element 21 relating to the latch operation is shown.

Figure 2:
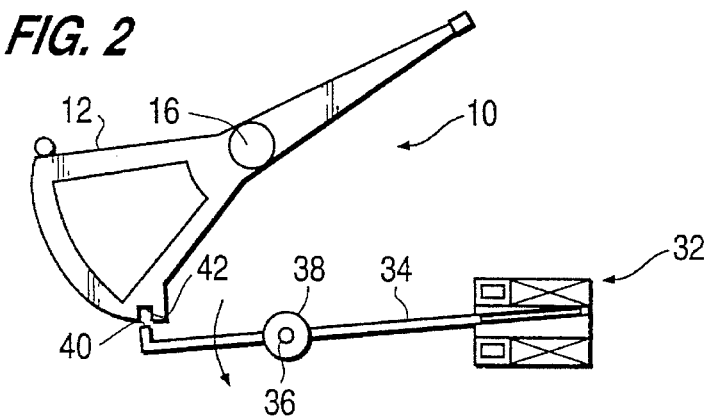
FIG. 2 illustrates the latch mechanism according to the invention and the head-arm assembly in a free, unlatched position.

As FIG. 2 illustrates, the end of the locking arm (its outboard end) nearest the actuator end 12 of the head-arm 10 is preferably provided with a tang 40, which engages a corresponding recess or slot 42 in the head-arm 10. In FIG. 1, the tang 40 has engaged the slot 42, so that the head-arm 10 is locked and prevented from rotating. In FIG. 2, the tang 40 is clear of the head-arm 10, so that the head-arm is free to rotate. Other locking arrangements are also possible. For example, the tang 40 could be a part of the head-arm, whereby the locking arm 34 could be provided with a fork that engages the tang. Mating grooves or teeth may also be used, as may be mating pins and slots or high-friction regions or locking elements on portions of the locking arm 34 or head-arm 10. Friction locking alone, however, will in general not be as secure as the positive mechanical engagement provided by the mating tang and slot.

The invention makes use of several physical properties of magnetic materials, and it is helpful to keep these in mind. First, as is well known, a magnet attracts most ferrous elements, regardless of whether the ferrous elements are themselves permanent magnets. Second, opposite magnetic poles attract, and like magnetic poles repel one another. Third, when placed in a sufficiently strong magnetic field, ferrous materials become magnetized and thereby act as magnets themselves with apparent north and south poles. Fourth, a magnet placed in another magnetic field will strive to align itself such that its internal flux lines agree in direction and polarity with the other field.

In the following description of the invention, the "outboard" end of the locking arm is the end that comes into contact with the moving member (in rotary disk drive applications, the head-arm). In FIG. 1, for example, the tang 40 is at the outboard end of the locking arm. The "inboard" end is the end opposite the outboard end. In most applications, the inboard and outboard ends will be on opposite sides of the bearing 38. As is mentioned below, however, it is also possible for the two ends to be on the same side of the bearing, with the inboard end being the portion of the locking arm closest to the bearing.

Figure 3:
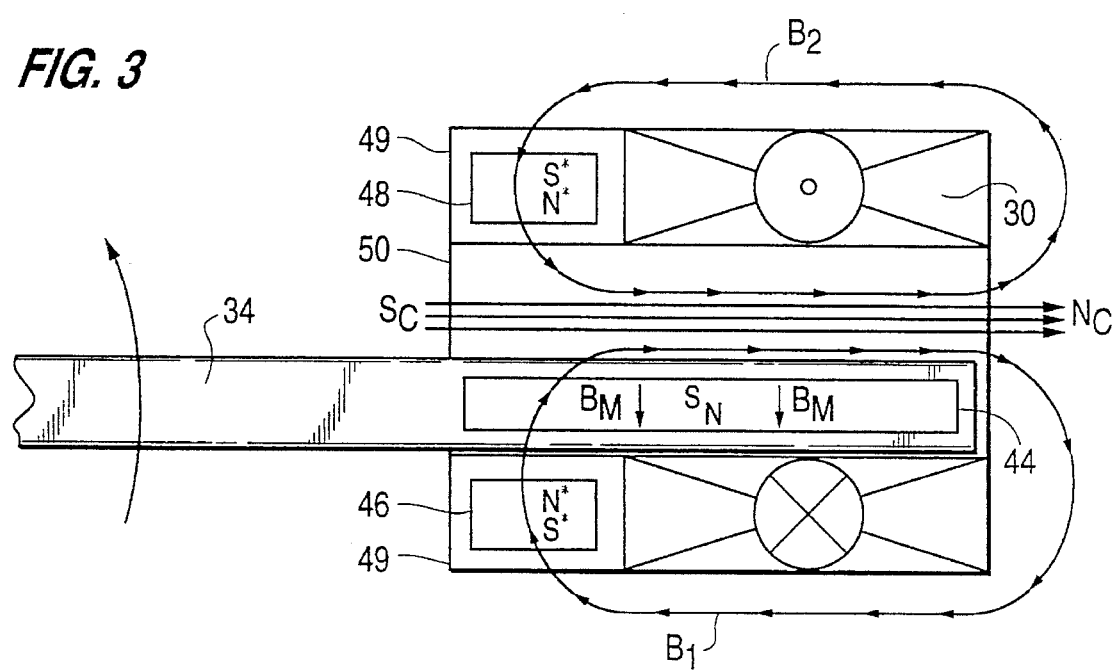
FIG. 3 illustrates on a larger scale the elements of a fixed-coil embodiment of the latch mechanism, as well as the electrical and magnetic states of the main components of the fixed-coil embodiment of the latch mechanism as it is about to switch from the latched to the unlatched position.

FIG. 3 is a cross-sectional view of a fixed-coil embodiment of the latch mechanism taken along a plane that is substantially parallel to the plane of motion of the locking arm (perpendicular to its axis of rotation). For the sake of clarity, the various sectioned elements in the latch mechanism have not been provided with hatching. Also, the electrical states of portions of the coil 30 are illustrated either by a circle-cross "⊗", indicating a current direction into the plane of the paper, a circle-dot "⊙" indicating current direction out of the plane of the paper, or by no circle at all (only the cross mark extending to the corners of the coil portions), indicating that no significant current is flowing in the coil.

As FIG. 3 illustrates, a permanent magnet 44 is attached to or embedded in an inboard end of the locking arm 34. The coil 30 is mounted so as to substantially surround the permanent magnet 44. The permanent magnet thus extends within the core of the coil. Referring also to FIGS. 1 and 2, the core of the coil should be large enough that the tang 40 should engage the slot 42 when the head-arm 10 is to be locked and the permanent magnet 44 contacts or is at least very close to the lower coil portion (as in FIGS. 1 and 3); when the tang is to be clear of the slot, however, the permanent magnet should contact the upper coil portion (as in FIG. 2).

The cross section of the coil may be generally circular, rectangular, or of any other convenient shape; according to the invention, the only requirement is that the direction of the coil's internal flux should be substantially perpendicular to the direction of polarization of the permanent magnet(s). (In a moving coil embodiment described below, there are two or more permanent magnets, but this relationship still holds.) Simple calculation will give the proper coil inside dimension for any given locking arm length, and vice versa.

Note that this calculation can be done once—unlike conventional spring clips and the like there is no need to calibrate each latch.

In the locked position shown in FIG. 3, the permanent magnet 44 preferably extends mainly parallel to the axis of the coil 30. The poles of the permanent magnet 44 are indicated as N and S, as is conventional, and the vectors of magnetic flux of the permanent magnet 44 are indicated as $B_M$. The locking arm, or at least the inboard end portion, is preferably non-magnetic so as not to shunt the magnetic flux of the permanent magnet 44 in the core of the coil.

The latch mechanism according to the invention also includes first and second preferably low-reluctance elements 46, 48, which are mounted adjacent to the coil 30. These elements have the property that they have low magnetic reluctance, which means that they are attracted by magnets and exhibit easily induced magnetic poles (they become "temporary magnets") when they have been subjected to a magnetic field, but do not exhibit such magnetic poles otherwise. Ferrous elements are preferred since they create strong induced magnetic poles and are readily available, easy to manufacture, and inexpensive, but other materials having the required properties may also be used.

The coil 30 and low-reluctance, preferably ferrous elements 46, 48 are preferably supported by a bracket, frame, or housing 50. If a housing is provided, it is preferably external and non-magnetic, with the coil and ferrous elements mounted on its inner surface. It may also be an internal frame, in which case it should be non-magnetic so as not to weaken the interaction between the permanent magnet 44 and the ferrous elements 46, 48, or to shunt the magnetic field of the coil 30.

The housing may, however, also be ferrous, in which case it will act as a shield that can reduce leakage of the magnetic field of the coil when the coil is energized. In such case, the housing will magnetically act as, and physically may be, an extension of the two low-reluctance elements 46, 48. If such ferrous housing is too close to the permanent magnet 44, however, the force of attraction between it and the permanent magnet may so great that, with the current available, the coil's field will not be able to apply sufficient torque to the permanent magnet to overcome the attractive force. With this in mind, conventional calculation and experimentation will determine the proper dimension of a ferrous housing.

The inner dimension of the coil 30 and/or the distance between the ferrous elements 46, 48 is preferably just great enough to allow the tang 40 or other locking element on the outboard end of the locking arm 34 to move completely free of the head-arm 10 in the unlatched position, but to engage the slot 42 securely in the latched position. By keeping this distance to a minimum one also increases the switching speed of the latch mechanism, since the inboard end of the locking arm has the shortest distance to cover when switching states.

In FIG. 3 the coil is energized (the latch controller 27, in a known manner, passes electric start-up current to the coil) such that, viewed from the left, the current in the coil flows clockwise (viewed as in FIG. 3, the current in the upper coil portion flows out of the plane of the figure, and the current in the lower coil portion flows into the plane of the figure). The lines of magnetic flux of the energized coil are indicated with the long arrows passing through the coil, and the corresponding poles of this field are indicated as $N_c$ and $S_c$, where the subscripted "c" indicates "coil". Note that the magnetic field of the coil, within the coil's core, is substantially perpendicular to the polarization of the permanent magnet 44.

As is well known from the theory of magnetism, with the coil energized as shown in FIG. 3, flux lines are developed as indicated by arrow-loops $B_1$ and $B_2$, and as shown by the long arrows in the center region of the coil. The low-reluctance elements 46, 48 concentrate magnetic flux to a greater or lesser degree depending of the intrinsic magnetic properties of the material from which they are made. With the lines of flux as illustrated by the arrow-loops $B_1$ and $B_2$, a north pole $N^*$ exists at the surface of each element 46, 48 from which the arrows "leave", and a south pole $S^*$ exists at the surface of each element at which the arrow "enters". The low-reluctance elements 46, 48 are located close enough to the energized coil to be in the field developed by the coil. As a result of the flux-concentrating capability of the material, strong magnetic poles are developed at the element surfaces as shown in FIG. 3. (Induced poles are indicated by superscripted stars.)

It is at this point that the various magnetic forces come into play. In the electrical and magnetic state illustrated in FIG. 3, the induced north pole $N^*$ of the first ferrous element 46 repels the north pole N of the permanent magnet; this repulsive force acts to force the permanent magnet 44 upward (viewed as in FIG. 3), so that it also acts to cause the locking arm 34 to rotate counter-clockwise (CCW). At the same time, the induced north pole $N^*$ of the second ferrous element 48 attracts the south pole S of the permanent magnet; this attractive force also acts to force the permanent magnet 44 upward, and thus increases the force tending to cause the locking arm 34 to rotate counter-clockwise.

A pure torque in the CCW direction is also applied to the permanent magnet (and thereby to the locking arm to which it is attached). To understand this pure torque one should recall the fundamental theories of magnetic moment described by Ampere and Maxwell. Let $\bar{m}$ be the magnetic moment (with magnitude m) of a permanent magnet placed in a uniform magnetic field $\bar{H}$ (with magnitude or strength H) and $\bar{T}$ the torque (with magnitude T) on the permanent magnet. Then $\bar{T}=\bar{m}\times\bar{H}$, where × represents the vector cross product. Put in simpler terms, the permanent magnet will experience a torque T equal to the product m.H.sin α, where alpha (α) is the angle between the direction of magnetization of the two fields in the plane containing both magnetic axes.

In yet simpler terms, the permanent magnet in the uniform magnetic field is subjected to a pure torque that causes it to turn in an attempt to align its south pole with the entering arrow of the magnetic flux, and to align its north pole with the exiting arrow of the field. In other words, the flux direction inside the magnet agrees with the flux direction in the field surrounding the magnet. As is well known, all physical systems attempt to achieve their least-energy state, and this position (flux alignment of the coil and permanent magnet) is the least potential energy state of the system. This phenomenon is the central principle of a common compass. Referring to FIG. 3, with the direction of flux of the coil as shown, this means that the permanent magnet 44 will experience a pure torque tending to cause it to rotate counter-clockwise.

From the known laws of mechanics, a pure torque exerted on a free body will cause that body to rotate about its center of gravity. If the body is pivoted about an axis and a pure torque is applied anywhere on the body in a plane perpendicular to that axis, the body will tend to rotate about that axis as though the torque were applied at the axis of rotation. If the axis of rotation does not pass through the center of gravity of the body, other factors such as moment of inertia of the body will affect the resulting mechanical forces on the axis of rotation.

For the purposes of this invention, such variation in mechanical forces is insignificant and the assumption may be made that a torque applied anywhere in the plane of the locking arm and perpendicular to the axis of rotation of the locking arm will act as though that torque has been applied at the axis of rotation. In this way, the pure torque exerted on the magnet embedded in the locking arm by the magnetic field inside the coil surrounding that magnet will cause the locking arm to rotate about its pivoted axis of rotation.

It is for this reason that the locking arm preferably is mounted to pivot about its center of mass. Since the locking arm is subjected to a pure torque from the magnetic field of the coil, this torque is translated to the pivot shaft 36 (which preferably passes through the arm's center of mass). This means that there are insignificant reaction forces on the bearing (only torque), so that the life of the bearing will be greatly lengthened. In order to avoid gaps and imprecision, bearings are often pre-loaded so that they can absorb the reaction forces from the arm, but the pre-loading and the reaction forces themselves stress the bearing and reduce its life span. Using the pure torque actuation of the locking arm according to the invention, therefore, bearing wear is greatly reduced as compared to known devices. This also means that the bearing in the invention will tend to create much fewer particles than in conventional devices.

According to the invention, it is not necessary to mount the locking arm 34 at its center of mass. In order to reduce the size of the disk drive, for example, it may be necessary or preferable to have an angled or curved locking arm, and it may not be possible to mount the arm at its center of mass. Even in this case, however, the latch mechanism according to the invention will meet all of the requirements 1–4 listed above.

Figure 4A:
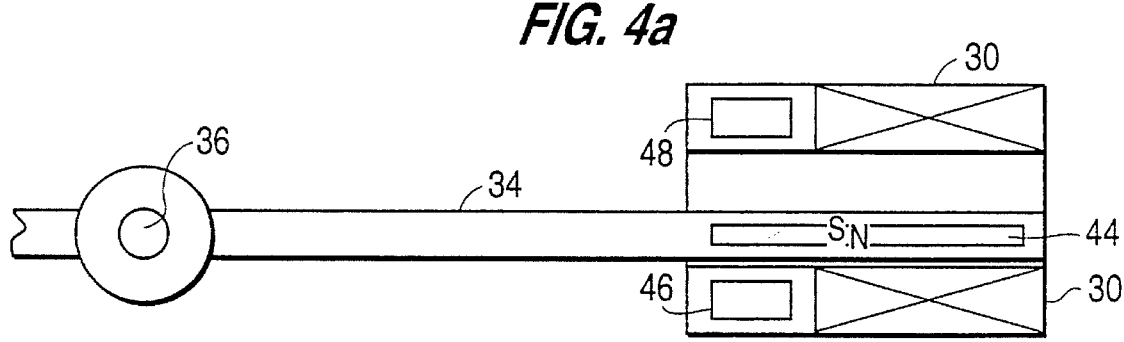

FIG. 4a illustrates the latch mechanism according to the invention in the locked position. In the locked position, no current flows through the coil 30, and there is the natural attractive force between the permanent magnet 44 and the first low-reluctance, preferably ferrous element 46. The configuration shown in FIG. 4a is the same as is shown in FIG. 1. Since the locking arm may be made relatively long (depending on its shape and on the available space in the disk drive housing), the moment arm of the latch mechanism is long, and the latching force of the tang 40 in the slot 42 is correspondingly great.

Furthermore, simply by choosing the permanent magnet to be sufficiently strong, jolts and vibrations encountered when the user carries or handles the computer containing the disk drive will not be strong enough to overcome the attractive force and the arm will remain latched. The invention therefore satisfies the first requirement for a latch listed above.

Figure 4B:
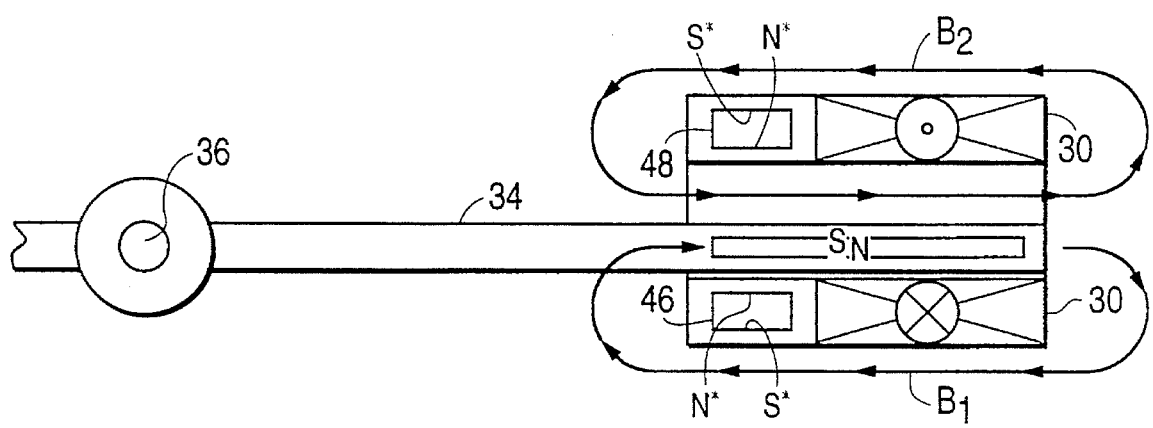
Figure 4C:
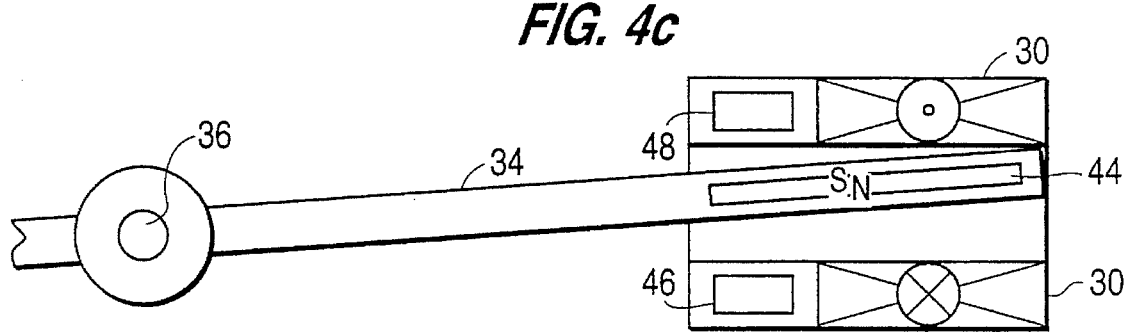

FIG. 4b shows the mechanical, electrical and magnetic configuration of the latch mechanism immediately upon energization of the coil 30. This is described above with reference to FIG. 3. The arm 34 is torqued counter-clockwise about its pivot point (the pivot shaft), which causes the tang 40 to leave and clear the slot 42. The arm 34 will continue to rotate counter-clockwise until it comes in contact with the coil 30 or with any inner covering or other stopping element that may be provided to limit the counter-clockwise rotation of the arm 34; FIG. 4c illustrates the configuration immediately upon this contact.

Referring to FIG. 4c, the locking arm is seen to have rotated counter-clockwise to the mechanical limit of rotation allowed by the design. Current is shown to still be flowing in the coil windings in the same direction. Note that the induced magnetic poles of the second ferrous element 48 tend to attract the permanent magnet 44 in the locking arm 34. Normally, this current is shut off as soon as the conventional head-arm servo circuit (not shown) detects that the head-arm assembly is free from the tang 40 on the end of the locking arm 34.

Referring to FIG. 4d, the locking arm is seen to be held in the "unlatched" or "free" position by the attractive force between the second ferrous element 48 and the magnet 44 in the locking arm. There is no current in the coil 30 in this state. This state is also shown in FIG. 2. Note that the distance between the second ferrous element 48 and the permanent magnet 44 is somewhat greater than was depicted in FIG. 4a or 4b. This greater distance, which can be designed into the latch in several ways, serves to decrease the attractive force between the locking arm 34 and the second ferrous element 48. The reason for this difference is described below.

FIG. 4e depicts the latch mechanism immediately when it is to move from the "free" position shown in FIG. 2 to the "latched" or "locked" position shown in FIG. 1. Note first that the direction of current flow in the coil 30 is the opposite of what it is when the latch mechanism is to switch from the latched to the unlatched position.

As is explained above, power failure to the disk drive causes the power failure circuitry to connect the spindle motor drivers electrically to the latch coil and the head-arm coil (not shown, contained in the known arm actuator that drives the head-arm) in the correct sense to start the motion of the head-arm assembly toward the latch. At the same time, the circuitry energizes the coil 30 so as to start the locking arm 34 rotation to the "locked" or "latched" position shown in FIGS. 1 and 4a.

Again, note that the ferrous elements 46, 48 have magnetic poles $N^*$ and $S^*$, but that the induced polarity of the ferrous elements 46, 48 is reversed relative to the configuration shown in FIGS. 2, 4b and 4c. The second ferrous element 48 therefore repels the permanent magnet 44 (poles S and $S^*$ repel each other) at the start of the clockwise rotation of the head-arm assembly. The adjacent induced pole $S^*$ of the first ferrous element 46, however, now attracts the permanent magnet 44 (poles N and $S^*$ attract each other).

As before, the permanent magnet 44 also experiences a pure torque from the interaction of its flux and that of the coil 30. As FIG. 4e indicates, however, since the direction of current in the coil 30 is reversed relative to the configuration shown in FIG. 3, the coil's flux ($N_c$ and $S_c$) is also reversed. The polarity of the permanent magnet 44, on the other hand, of course stays the same, and the result is that the direction of torque is reversed relative to before. In other words, the pure torque on the locking arm when the arm is to lock is clockwise (viewed as in the figures).

The voltage available from the spindle motor acting as a generator described is typically relatively low and has a short duration at a usable voltage as the spindle motor decreases speed. In that short period, and using that available voltage, the head-arm assembly and the locking arm 34 must be driven to the latched position shown in FIG. 1. By the nature of the process and the voltage limitations, the energy required to release the locking arm 34 from the attractive force of the second ferrous element 48 should therefore preferably be somewhat less than the energy needed when the arm is freed or released during power-up, when much more power is typically available.

Comparing FIG. 4a and FIG. 4d, one will see that the permanent magnet 44 is preferably closer to the first ferrous element 46 in the latched position than it is to the second ferrous element when it is in the unlatched position. The magnetic force of attraction between the permanent magnet 44 and the second ferrous element 48 is therefore less, and less energy is required to overcome this force, which must be done when the locking arm 34 must be moved to the latched position. Although it simplifies design and manufacture to have the ferrous elements substantially identical, this effect may also be achieved by making the first ferrous element larger than the second, by having the first ferrous element to have lower reluctance than the second, or by other methods such as changing the mounting of the two ferrous elements.

Note that, as shown in FIGS. 1–4e, the repulsive/attractive forces of the induced poles in the fixed-coil embodiment always augment the torque applied to the arm by the interaction of the permanent magnet and the field of the energized coil 30. This provides an initial impulse to accelerate the locking arm away from its previous state, and it increases switching speed.

As FIGS. 1–4e illustrate, the ferrous elements 46, 48 are preferably mounted in brackets or recesses 49 to be integral with the coil 30, and located between the coil 30 and the locking arm bearing, but this is not necessary. The ferrous elements could also be mounted on the far inboard end of the coil, so that the coil is between the ferrous elements and the bearing.

Such an arrangement would provide additional moment arm to increase the "holding power" of the locking arm when the coil is not energized. On the other hand, the poles induced in the low-reluctance elements 46, 48 when the coil is energized would have fields reversed from the direction desired, and the torque imposed on the magnet by the coil field would have to overcome the attractive force between the induced poles and the permanent magnet. In other words, moving the low-reluctance elements inboard relative to the coil increases the moment arm of the locking arm when the coil is not energized, but it requires either a stronger coil field (and more available current) or a sacrifice of some of the acceleration of the locking arm when it is to switch states.

The designer may also increase the holding power of the latch mechanism in other ways. For example, the distance can be reduced between the permanent magnet 44 and the first ferrous element 46 in the latched position. One may also increase the strength or volume of the permanent magnet 44 itself, but in such case the designer must ensure that, with the voltage available upon power failure, the pulse of current to the coil 30 will create a magnetic field strong enough the overcome the attractive force between the permanent magnet 44 and the second ferrous element.

Finally, as shown in FIG. 4e, the locking arm 34 rotates clockwise until it reaches the first mechanical limit of rotation, as shown in FIG. 4a. Current may continue to flow in the coil windings as the spindle motor continues to decrease in speed. This current serves to hold the head-arm assembly 10 and the locking arm 34 in the latched position shown in FIG. 1. Eventually, the current will die out and the state of the latch will be as it was first described with reference to FIG. 4a (also shown in FIG. 1).

FIG. 5 illustrates a moving coil embodiment of the latch mechanism according to the invention. In this embodiment, a coil 52 is wound around the inboard end of the locking arm 34 so that its magnetic axis extends substantially in the radial direction of the locking arm, that is, it intersects or at least passes near the axis of rotation of the locking arm and lies mainly in the plane of motion of the locking arm.

First and second permanent magnets are mounted on a casing or yoke 58 on either side of the inboard end of the locking arm 34. The casing or yoke 58 surrounds the inboard end of the locking arm on all sides but the side facing the bearing 38 and is preferably ferrous so that it effectively acts as a shield to reduce leakage of the various magnetic fields, especially of the coil when energized.

The latch control circuit 27 (see FIG. 1) is electrically connected with the coil 52 via conductors 59, 60. At their point of contact with the locking arm 34, the conductors 59, 60 should be able to rotate so that they do not significantly hinder the free rotation of the locking arm 34 about its pivot 36. The conductors may, for example, be provided in the form of a flex cable, and the bearing may also be provided with a known commutation arrangement. The polarity of the current through the conductors determines the direction of current flow in the coil 52.

In the moving coil embodiment of the invention, the low-reluctance, preferably ferrous elements 46, 48 are also mounted on the arm, inboard relative to the coil, and can be separated by an end portion 61 of the locking arm.

The permanent magnets 54, 56 are mounted so that their internal flux directions are the same. In FIG. 5, the internal flux of each permanent magnet is "up", that is, substantially perpendicular to the radial direction of the locking arm 34. The poles of the permanent magnets 54, 56 are indicated as N and S, as is conventional. The vectors of magnetic flux between the permanent magnets, that is, in the gap in which the coil 52 moves, are indicated as $B_M$. The locking arm, or at least the inboard end portion, is preferably non-magnetic so as not to shunt the magnetic flux of the permanent magnets 54, 56 between these magnets. In the preferred case in which the casing 58 forms a ferrous yoke, the yoke 58 concentrates and channels the magnetic flux of the permanent magnets 54, 56 clockwise (viewed as in FIG. 5) within the yoke, from the north pole of the second permanent magnet 56 around to the south pole of the first permanent magnet 54, thereby completing the magnetic circuit.

The distance between the permanent magnets 54, 56 is preferably just great enough to allow the tang 40 or other locking element on the outboard end of the locking arm 34 to move completely free of the head-arm 10 in the unlatched position, but to engage the slot 42 securely in the latched position. By keeping this distance to a minimum one also increases the switching speed of the latch mechanism, since the inboard end of the locking arm has the shortest distance to cover when switching states.

Viewed as in FIG. 5, the coil 52 is energized so that the current i flowing within its windings as indicated by the vertical arrows. (Viewed from the inboard end of the locking arm 34 toward the pivot shaft 36, the current i flows clockwise.) The north pole No of the energized coil is therefore at its outboard end (toward the pivot 36), and its south pole $S_c$ is at its inboard end.

Viewed as in FIG. 5, the internal flux of the coil 52 is from right to left. The external flux of the coil is therefore counter-clockwise between the coil 52 and the first permanent magnet 54 and clockwise between the coil 52 and the second permanent magnet 56. Between the coil 52 and each permanent magnet 54, 56, the flux $B_c$ of the coil is substantially perpendicular to the flux $B_M$ of the respective permanent magnet. Since the ferrous elements 46, 48 are within the magnetic field of the energized coil 52, a north pole $N^*$ exists at the surface of each element 46, 48 from which the flux vectors $B_c$ "leave" and a south pole $S^*$ exists at the surface of each element 46, 48 at which the flux vectors $B_c$ "enter".

As is well known, the coil 52 (and the locking arm 34 to which it is attached) will strive to align its internal flux with the internal flux of the permanent magnets 54, 56. Viewed as in FIG. 5, the coil 52 will therefore strive to rotate clockwise (a substantially pure torque). As in the fixed coil embodiment, the locking arm is preferably mounted so that the pivot 36 passes through the center of mass of the locking arm (and of all elements, such as the coil and the ferrous elements, that move with the locking arm). The pure torque arising on the coil is therefore translated to the pivot 36 to torque the locking arm clockwise, from the unlatched to the latched position. Of course, even if the pivot 36 does not pass through the center of mass, the locking arm will still be torqued clockwise, but then reaction forces will arise on the bearing 38.

As in the fixed coil embodiment, the poles induced in the low-reluctance elements 46, 48 augment the torque applied to the arm by the interaction of the permanent magnets 54, 56 and the field of the energized coil 52. For the case illustrated in FIG. 5, the south pole $S^*$ induced in the second ferrous element 48 is repelled from the adjacent south pole S of the second permanent magnet 56, while the south pole $S^*$ induced in the first ferrous element 46 is attracted by the adjacent north pole N of the first permanent magnet 54.

Figure 6A:
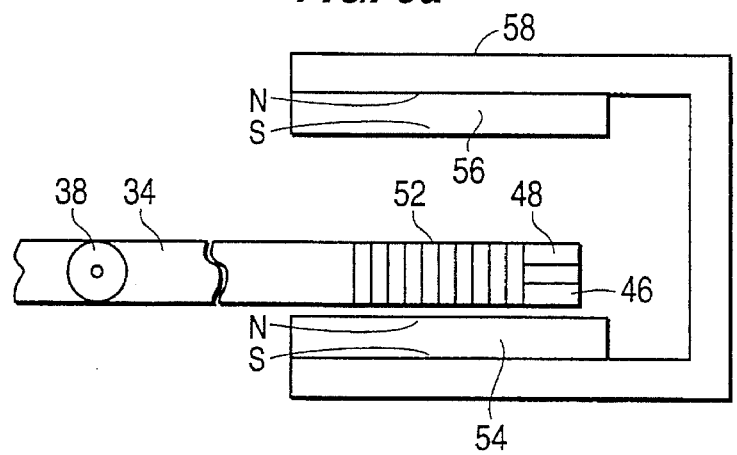
FIGS. 6a–6c illustrate sequentially the transition of the moving-coil embodiment of the latch mechanism according to the invention from the latched to the unlatched position, as well as the electrical and magnetic states of the main components.

In FIG. 6a, the moving coil embodiment is illustrated in the latched state. In this state, the coil 52 is not energized, but the first permanent magnet 54 attracts the first ferrous element 46 (and, to a lesser extent, the second ferrous element 48) to hold the locking arm. Since the ferrous elements 46, 48 in this embodiment are preferably located at the extreme inboard end of the locking arm, the moment arm of the locking arm and therefore its "holding power" are maximized.

Figure 6B:
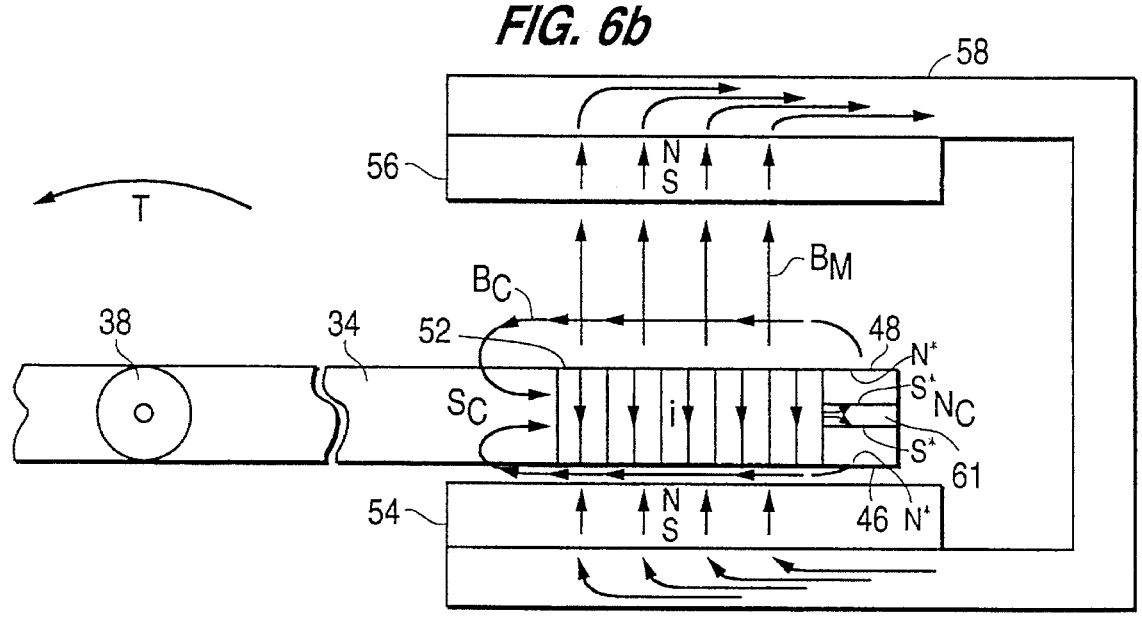

In FIG. 6b, the coil 52 is energized with current i in the direction opposite to the direction shown in FIG. 5. Its flux direction is therefore also reversed (with the north pole $N_c$ at the inboard end), as are the polarities of the ferrous elements 46, 48. The flux of the permanent magnets 54, 56 however has the same direction ("up", viewed as in FIGS. 5 and 6b), so that the substantially pure torque applied to the locking arm 34 via the coil 52 is counter-clockwise. This means that the locking arm 34 is torqued from the latched state toward the unlatched state.

Observe that, as in the fixed coil embodiment, the poles induced in the low-reluctance elements 46, 48 augment the torque applied to the arm by the interaction of the permanent magnets 54, 56 and the field of the energized coil 52. In most applications of both embodiments, however, the force created by the interaction between the permanent magnets and the ferrous elements when the coil is energized is much weaker than the force created by the interaction between the magnetic fields of the permanent magnets and of the energized coil. Although the force between the ferrous elements and the permanent magnets may cause small reaction forces of the bearing 38, by far the greatest influence on the locking arm 34 will therefore still be the pure torque applied by the interaction of the energized coil's field and the fields of the permanent magnets.

From a practical standpoint the ferrous elements 46, and 48 may be combined into one ferrous part without changing the magnetic effects described above. In such a single-part embodiment, the apparent south pole appears nearest the inside of the coil when the coil field is polarized as shown in FIG. 6b and the north pole $N^*$ appears at the periphery as shown. The flux inside the ferrous part curves accordingly. The ferrous elements are shown as separate elements (rather than regions of a single element) only for clarity of explanation.

Figure 6C:
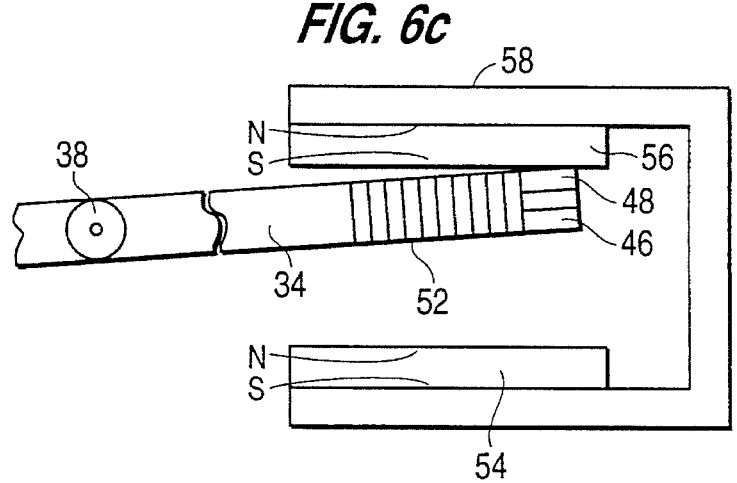

With the current flowing as shown in FIG. 6b, the locking arm 34 is torqued counter-clockwise until it reaches the fully unlatched position, in which it comes in contact with the second permanent magnet 56, or with any covering or other stopping element that may be provided to limit the counter-clockwise rotation of the arm 34; FIG. 6c illustrates the configuration immediately upon this contact. Even with no current supplied to the coil 52, the locking arm 34 is held in the unlatched position by the force of attraction between the second permanent magnet 56 and the second ferrous element 48 (and, to a lesser extent, the first ferrous element 46).

Figure 6D:
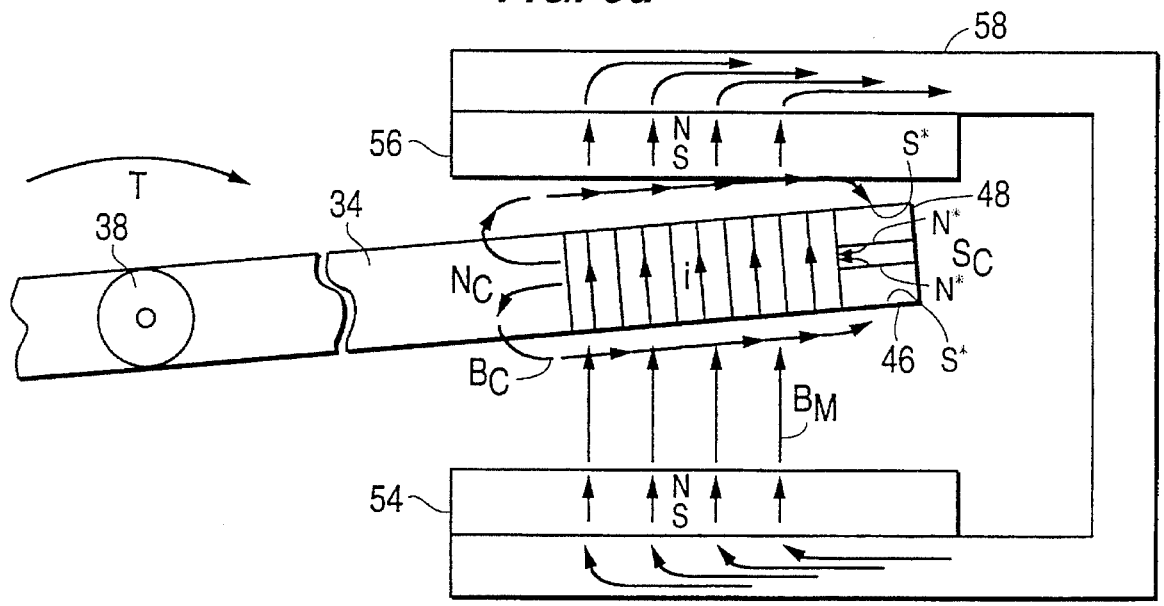
FIG. 6d illustrates the electrical and magnetic states of the components as the latch is about to switch from the unlatched to the latched position.

In order to switch the locking arm from the unlatched position to the latched position, current i is applied to energize the coil as shown in FIG. 6d. This is mainly the same configuration shown in FIG. 5, and as explained above, the locking arm is torqued clockwise until it reaches the fully latched position, in which it comes in contact with the first permanent magnet 54, or with any covering or other stopping element that may be provided to limit the clockwise rotation of the arm 34; FIG. 6a illustrates the configuration immediately upon this contact.

The greater the force of attraction between the permanent magnets 54, 56 and the ferrous elements 46, 48, the greater will be the power of the latch mechanism to hold the arm in the latched or unlatched positions. As in the case of the fixed coil embodiment described above, the designer may therefore vary the shape, size, mounting, and magnetic properties of the permanent magnets and/or low-reluctance elements, as well as the coil windings and amount of switching current supplied to the coil to achieve the desired holding power relative to the desired acceleration of the locking arm. For example, one way to reduce the attractive force between either or both of the permanent magnets 54, 56 and either or both of the ferrous elements would be to embed the ferrous element(s) in the inboard end of the locking arm, thereby increasing the distance between the permanent magnets and the respective ferrous element.

Compared to the fixed coil embodiment of the invention, the moving coil embodiment requires that the conductors 59 60 be run to the moving coil 52 without interfering unnecessarily with the free rotation of the locking arm. Any stiffness or springiness of the conductors at their point of attachment to the locking arm may also tend to hinder the free rotation of the locking arm, and care must be taken to minimize this effect. On the other hand, coil windings sufficient to accelerate the locking arm with the desired quickness and with the available current pulse will typically have less mass than the permanent magnet in the fixed coil embodiment. As a result, depending on the chosen characteristics of the coil and the permanent magnets, the mass attached to the inboard end of the locking arm in the moving coil embodiment will in many applications be less than in the fixed coil embodiment.

Because the moving coil will typically be lighter than the moving permanent magnet, the locking arm will be able to accelerate faster for given field strengths for the coil and permanent magnet. Furthermore, the fixed, permanent magnets in the moving coil embodiment may be made stronger without increasing the moving, inertial mass of the locking arm, thus providing yet another way of speeding up the reaction time of the locking arm without requiring an increase in available current to the coil.

Referring once again to FIG. 1, if the entire computer or system (disk drive, head-arm 10, latch mechanism, controller 22, mechanism arm 34 etc.) is subjected to a clockwise torque, the head-arm 10, and also the locking arm 34, will try to rotate counter-clockwise. If the locking arm 34 rotates more than the head-arm 10, the tang 40 will leave the slot 42 and the head-arm will become unlatched. This tendency to rotate is all the more pronounced since the head-arm 10 and the locking arm 34 both are preferably statically balanced, that is, both are preferably mounted to rotate about their centers of mass. The more violent the externally applied torque is, the greater is the risk that the head-arm will accidentally come unlatched.

According to the invention, the problem of accidental unlatching of the head-arm when the disk drive's platform is torqued is reduced or eliminated in either or both of two ways. First, as is explained above, the locking arm is preferably mounted for rotation about its center of mass; it is, in other words, statically balanced. Because the locking arm is statically balanced, forces (as opposed to torques) on the disk drive platform will not cause the locking arm to turn about its pivot 36. (The forces will act through the center of mass of the locking arm, but since this is preferably located on the axis of rotation of the locking arm, the moment arm for these forces is zero, so that no torque is created to turn the locking arm.)

As is well known from the theory of the mechanics of rigid bodies such as the locking arm 34, $T=J\cdot\ddot{\theta}$, where T is an applied torque, J is the moment of inertia of the body, and $\ddot{\theta}$ is the angular acceleration of the body. In other words, assuming a body is torqued by a given amount, the more inertial mass that body has, the slower it will start to rotate (accelerate angularly).

According to the invention, the locking arm is advantageously formed as an inertial lever, meaning that the statically balanced locking arm is given sufficiently great inertial mass (and thus moment of inertia) that it can overcome even violently applied external torques on the disk drive platform. This may be accomplished by using known methods to choose the size, material, and mass distribution of the locking arm to have a moment of inertia J great enough that the angular acceleration of the locking arm will be less than that which would allow the tang to leave the slot for externally applied torques of no greater than a predetermined value. The moment of inertia of the locking arm may, for example, be changed by making the body of the locking arm smaller but locating more mass at its ends (thus increasing the moment of inertia without increasing the mass of the arm), by adding weights or changing the thickness of portions of the arm, or by any other conventional method.

By designing the locking arm as an inertial lever, the head-arm will accelerate (angularly) faster than the locking arm under the influence of the torque applied externally to the disk drive platform, so that the tang 40 will not slip out of the slot 42. External torques on the disk drive will typically result from bumps or jolts as the user carries it. Expected maximum external torques can therefore be estimated in advance and determined by measurement during durability tests. Using the formula above ($T=J\cdot\ddot{\theta}$), and taking into account bearing friction, for a given maximum expected torque $T_{max}$ one can easily determine the expected relative angular accelerations of the head-arm and locking arm and design the locking arm's moment of inertia so that the tang will not slip out of the slot under the influence of the expected torques.

Figure 7:
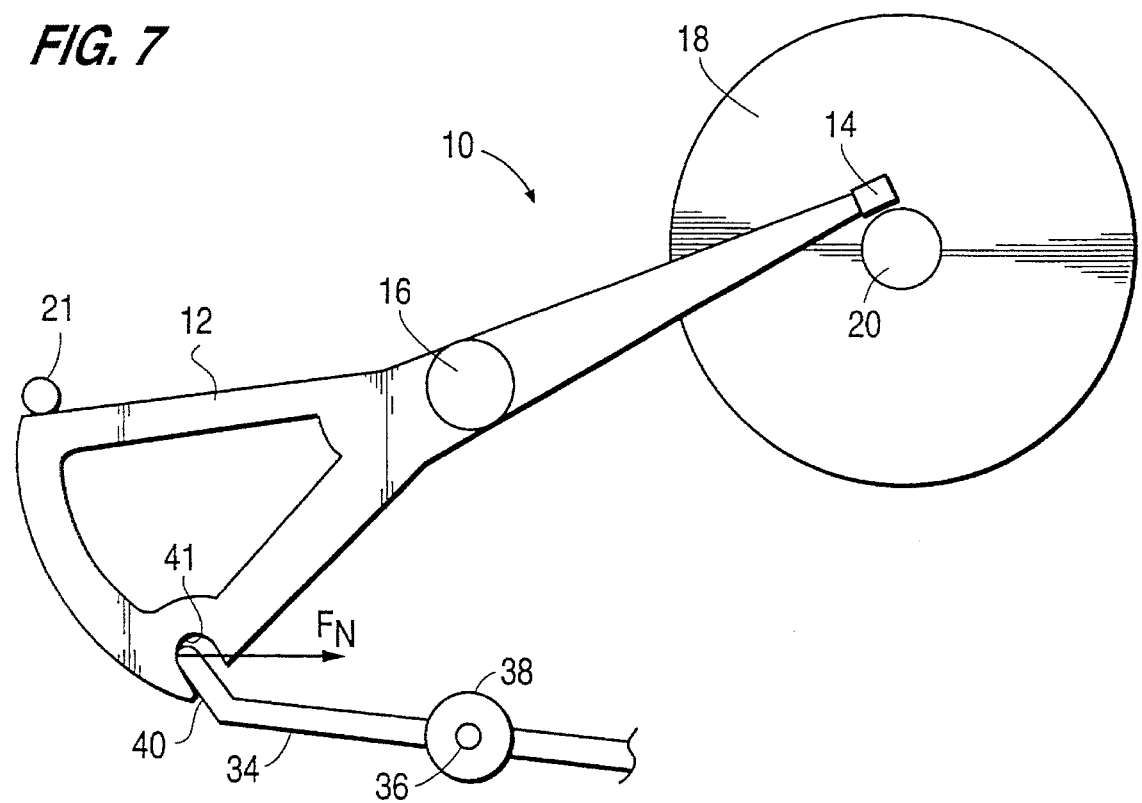
FIG. 7 illustrates a configuration of a locking element on the arm and a slot on the moving member that prevents the moving member from becoming unlatched accidentally because of being torqued in a predetermined direction.

FIG. 7 illustrates a second arrangement for reducing or eliminating the risk of accidental unlatching of the head-arm when the disk drive's platform is torqued. In FIG. 7, the head-arm 10 is once again shown in the parked or safe position. As FIG. 7 illustrates, the tang 40 engages the slot or indentation 42 in this latched position. According to the invention, the tang 40 is angled toward the head-arm and the slot is shaped in such a way that the direction of the contact or normal force $F_N$ between the tang 40 and the slot 42 is directed between the pivot 36 of the locking arm 34 and the pivot 16 of the head-arm 10.

Referring to FIG. 7, assume the disk drive platform is subjected to an external torque (even a violent one) clockwise. Because of the inertia of the head-arm 10 and locking arm 34, both of these arms will attempt to rotate counterclockwise. The contact force $F_N$, however, is directed in such a way that it torques the locking arm clockwise, and the harder the head-arm 10 pushes against the tang 40, the stronger the contact force $F_N$ will be. The result of this arrangement is that the tang 40 not only will not tend to slide out of the slot 42 when the platform is torqued clockwise, but it will rather jam even more tightly in the slot 42 to latch the head-arm 10 even more securely.

Now assume instead that the disk drive platform is subjected to an external torque (even a violent one) counterclockwise (viewed as in FIG. 7). The inertia of the head-arm 10 and locking arm 34 will cause both of these arms to attempt to rotate clockwise. Such rotation, however, merely holds the head-arm 10 in the parked position, pressing it even more firmly against the stop 21, and it presses the tang 40 even more firmly into the slot 42. Regardless of the direction of external torque, therefore, the locking arm 34 securely engages the head-arm 10 to latch it in the parked position.

The invention is not limited to the particular preferred embodiments described above. For example, although it will in most cases be more efficient to have a single coil, multiple coils may also be used. In particular, one coil could be energized when the arm is to be latched, and another, counterwound coil could be energized to move the locking arm into the unlatched position. The number of windings could be the same or could be different to provide for different magnetic field strengths. In this way, it would not be necessary for a polarity control circuit actually to switch the polarity of the current conveyed to the coils; rather, it would simply switch from one coil to the other.

Also, the latch mechanism may be used to latch any moving element. For example, assuming a linear actuator, the tang 40 or other locking element (such as teeth) could engage a slot, tab, rack, etc., on a linearly moving shaft, rod, or other member to lock it.

Furthermore, the polarities shown in the figures are by way of example only. The same advantageous interaction between the permanent magnet and the low-reluctance elements and the coil's field would result if all magnetic and current polarities were reversed.

Note that no electric power is necessary to hold the locking arm in either its latched or unlatched states; rather, the natural attractive force of the permanent magnet 44 (fixed coil embodiment) or permanent magnets 54, 56 (moving coil embodiment) and the respective ferrous elements 46, 48 provides sufficient holding power. The latch is therefore "bistable", in that the locking arm will remain in either the latched or the unlatched position or state without any external force. The locking arm changes states quickly and efficiently simply by "pulsing" the coil 30 (fixed-coil embodiment) or 52 (moving coil embodiment) with current of the proper polarity.

The locking arm according to the invention can, for example, switch from the unlatched or "free" position to the latched or locked position typically in a very short time, on the order of a few milliseconds, depending on the voltage the power failure circuitry either pre-stores or converts from the disk as it spins down.

Note also that the latch mechanism according to any embodiment of the invention can achieve its speed and holding power using only the single pivot 36; only one moving body is necessary (the locking arm and the elements attached to it). This greatly reduces not only the manufacturing complexity and cost, but also the risk of failure due to wear and contamination of moving parts and their bearings.

One advantage of mounting the permanent magnet or coil at the inboard end of the locking arm is that the torque arm of the locking arm can be kept great; this increases the holding force of the mating tang and slot (or other mating locking elements). It would, however, also be possible to mount the coil around the locking arm 34 on the same side of the bearing 38 as the tang 40 itself.

For the fixed coil embodiment, the permanent magnet in such case would be attached to or embedded in the arm at the appropriate place so as to be within the coil and adjacent to the ferrous elements. For the moving coil embodiment, the coil would be wound around the locking arm between the bearing and the tang, and the ferrous elements would be mounted or embedded adjacent to the coil. The housing or yoke 58 would then preferably be a substantially C-shaped channel whose arms would extend down on either side of the locking arm (and coil 52) and whose central section would cover the locking arm. The permanent magnets 54, 56 would be mounted on the downward extending yoke arms in the same manner as shown in FIG. 5 (although the flux of the permanent magnets would be channeled over the locking arm rather than around its inboard end).

Mounting the coil between the pivot 36 and the locking element 40 may in some cases reduce the torque that could be applied to the locking arm, but if this is acceptable then it may in such applications reduce the space requirements by allowing the locking arm to be shortened. Note, however, that such a configuration may make it impractical to mount the locking arm at its center of mass, although this would still be possible by providing the locking arm with a counterweight extension on the other side of the bearing.

The invention also contemplates other configurations of the permanent magnet(s) and the coil(s). One common feature of the various embodiments of the invention is, however, that the polarization of the permanent magnet(s) is substantially perpendicular to the flux directions of the coil in the primary regions of interaction of the fields of the permanent magnet(s) and coil(s).

In a variation (not shown) of the moving coil embodiment (see FIG. 5), for example, the coil may be mounted on the inboard end of the locking arm 34 so that the magnetic axis of the coil is mainly in the tangential direction of the locking arm. (The tangential direction is perpendicular both to the axis of rotation and to the radial direction of the locking arm. Viewed as in FIG. 5, for example, the tangential direction is vertical and in the plane of the figure.) The coil windings could, for example, pass through openings in the locking arm. The permanent magnets 54, 56 may then be replaced by a ring magnet (which may be circular, rectangular, or have some other closed shape) that encloses the coil and has its magnetic axis substantially in the radial direction. The outer surface of the ring magnet could be surrounded by a ferrous yoke to reduce field leakage.

In this ring magnet embodiment, the inboard end (or at least the portion of the locking arm around which the coil is wound) would move within the ring magnet, that is, within the internal field of the ring. In the ring magnet's internal field, its lines of flux extend mainly in the radial direction, substantially perpendicular to the internal flux of the coil. When the coil is energized, the internal fields will as before seek to align themselves with one another, whereby the locking arm is torqued in a direction that depends on the polarization of the coil.

A single (or more than one) ferrous element could be mounted either inboard or outboard of the coil (or with one on either side), and, depending on the polarization of the ring magnet, the ferrous element(s) would augment the torque applied to the arm. As in the other embodiments, the ferrous element(s) would still be attracted to the permanent magnet (the inner surface of the ring) in the latched or unlatched positions.

We claim:

1. A system for latching and unlatching a head-arm of a disk drive comprising:

a locking arm assembly including an elongated arm member, a first latching element and a first component of a magnetic latch actuator, said first latching element and said first component being mounted on said arm member at spaced apart first and second locations, said arm assembly having a center of gravity positioned essentially at a third location on said arm member spaced from and located between said first and second locations;

a pivot support pivotally mounting said arm assembly for swinging about an axis extending through said third location to move the first latching element between spaced apart latching and unlatching positions;

a head-arm mounted second latching element, said latching elements being cooperable to prevent movement of a head-arm from a safe parked position when the first latching element is in its latching position;

a second component of a magnetic latch actuator, the components of said actuator being cooperable to swing said arm assembly on said pivot support about said axis to thereby move the first latching element between its said positions;

one of said first and second components comprising a coil electrically connected so as to have selectable alternative first and second energized states, another of said first and second components comprising a permanent magnet, said coil and said permanent magnet being positioned and arranged so as to impose a substantially pure torque couple on said locking arm assembly at a location thereon remote from said axis, said torque couple being imposed in a first direction to torque said first latching element to its latching position when said coil is in its first energized state, and in an opposite direction to torque said first latching element to its unlatching position when said coil is in its second energized state;

a latch controller operable to selectively energize said coil in either said first state or said second state;

a power sensor for sensing an absence of power supply to a disk drive; and a power storage and supply source coupled to said power sensor to supply an electrical energization current to said coil via said latch controller to energize the coil in said first energized state when the power sensor senses said absence of power supply.

2. A system as set forth in claim 1 wherein said coil has an alternative non-energized state, said system further including a first low-reluctance element positioned for attracting the permanent magnet when the first latching element is in its latching position and the coil is in a non-energized state and a second low-reluctance element positioned for attracting the permanent magnet when the first latching element is in its unlatching position and the coil is in a non-energized state, said coil having a first magnetic flux direction when in its first energized state and a second opposite magnetic flux direction when in its second energized state, the polarization of the permanent magnet being substantially perpendicular to the first and second magnetic flux directions of the coil, whereby the locking arm assembly is torqued from the latching position of the first latching element to the unlatching position thereof when the coil has the first magnetic flux direction, and from the unlatching position to the latching position when the coil has the second magnetic flux direction.

3. A system as defined in claim 2, in which the first and second low-reluctance elements are mounted within the magnetic field of the coil and have induced magnetic poles when the coil is in an energized state, when the first latching element is in the latching position thereof, the magnetic flux of the coil is in the first direction and the induced magnetic pole of the first low-reluctance element is repelled by the permanent magnet to urge the locking arm assembly from the latching position to the unlatching position and the induced magnetic pole of the second low-reluctance element is attracted by the permanent magnet to urge the locking arm assembly from the latching position to the unlatching position, and when the first latching element is in the unlatching position thereof, the magnetic flux of the coil is in the second direction and the induced magnetic pole of the first low-reluctance element is attracted by the permanent magnet to urge the locking arm assembly from the unlatching position to the latching position and the induced magnetic pole of the second low-reluctance element is repelled by the permanent magnet to urge the locking arm assembly from the latching position to the unlatching position.

4. A system as defined in claim 3, in which the low-reluctance elements are mounted adjacent to the coil.

5. A system as defined in claim 3, in which the permanent magnet is closer to the first low-reluctance element when the first latching member is in the latching position than the permanent magnet is to the second low-reluctance element when the first latching member is in the unlatching position, whereby the attractive force between the permanent magnet and the respective low-reluctance elements is greater when the first latching member is in the latching position than when it is in the unlatching position.

6. A system as defined in claim 2, in which the low-reluctance elements are ferrous.

7. A system as defined in claim 1, in which the first latching element is a tang that extends from an outboard end of the arm member and the second latching element is a slot in the head-arm.

* * * * *

UNITED STATES PATENT AND TRADEMARK OFFICE
CERTIFICATE OF CORRECTION

PATENT NO. : 5,495,376
DATED : February 27, 1996
INVENTOR(S) : KEN G. WASSON et al.

It is certified that error appears in the above-indentified patent and that said Letters Patent is hereby corrected as shown below:

Column 2, line 46, after "stuck" insert --,--; and after "is" insert --,--.
Column 6, line 27, after "parked" and "safe" insert --,--.

Column 7, line 41, delete " $\hat{X}$ " and substitute --$\otimes$--.

Column 13, line 53, delete "No" and substitute --$N_c$--;
line 66, after "leave" insert --,--.

Signed and Sealed this

Twenty-eighth Day of May, 1996

Attest:

BRUCE LEHMAN

Attesting Officer   Commissioner of Patents and Trademarks